C. STONE.
CULTIVATOR.
APPLICATION FILED JUNE 26, 1913.
1,245,971.
Patented Nov. 6, 1917.
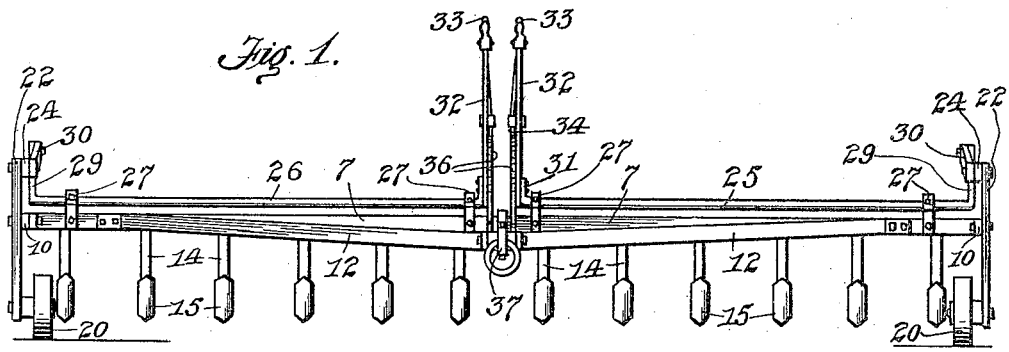
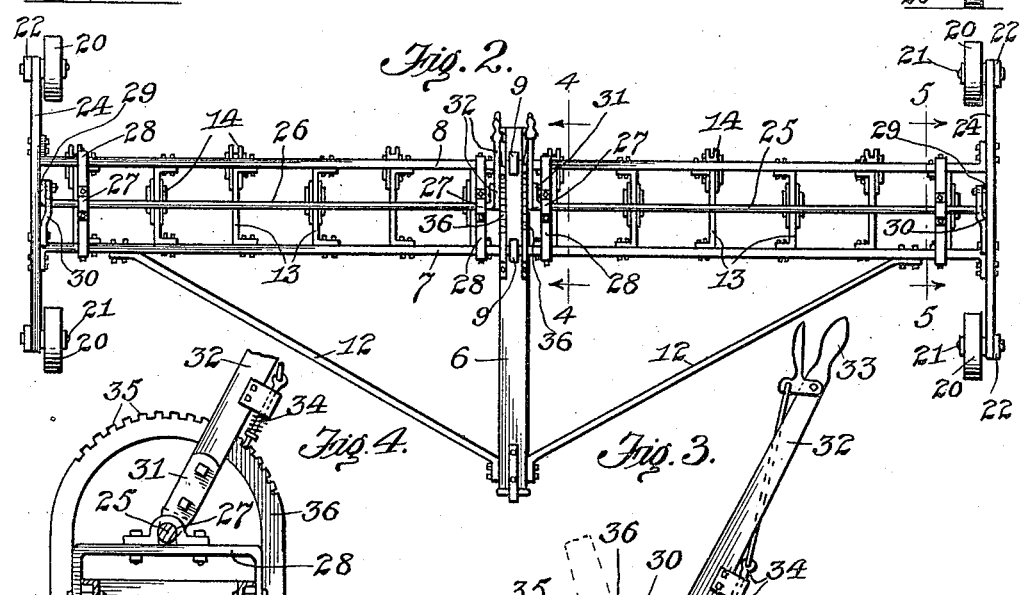
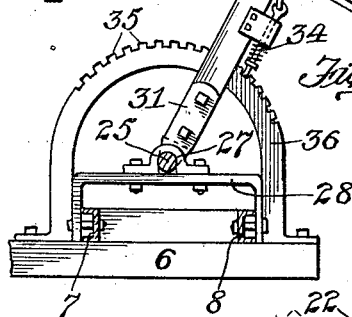
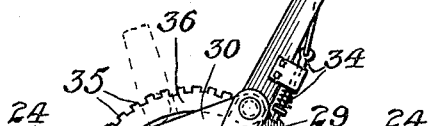
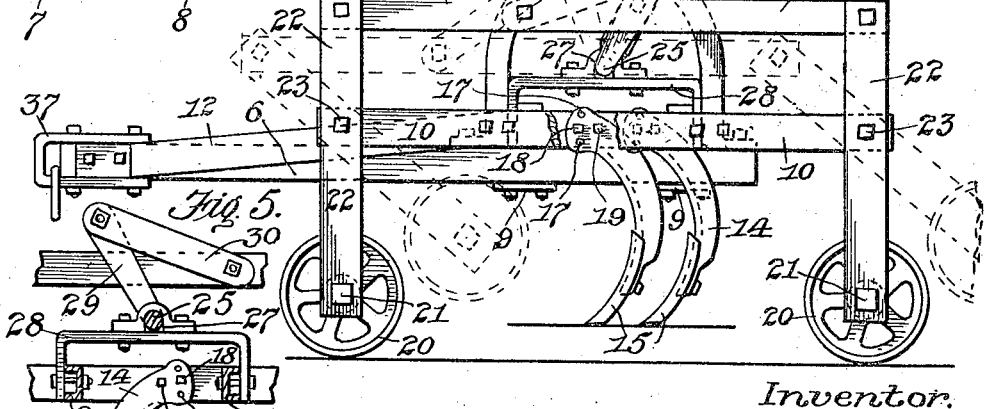
Inventor.
Claude Stone.
By Cassell Severance,
Atty.
Witnesses:
E. R. Pollard
G. Urquhart

UNITED STATES PATENT OFFICE.

CLAUDE STONE, OF SIERRA MADRE, CALIFORNIA.

CULTIVATOR.

1,245,971.     Specification of Letters Patent.     Patented Nov. 6, 1917.

Application filed June 26, 1913. Serial No. 775,883.

*To all whom it may concern:*

Be it known that I, CLAUDE STONE, a subject of the King of Great Britain, residing at Sierra Madre, in the county of Los Angeles and State of California, have invented certain new and useful Improvements in Cultivators, of which the following is a specification.

This invention relates to improvements in cultivators and especially to cultivators designed for use in orchards or other places where the ground is to be reached around trees and through vegetation of various kinds.

It is an object of the invention to provide a cultivator of considerable width so that it may reach and cover the ground to a considerable distance beyond the draft team. The device is thus capable of reaching beneath trees and the foliage of vegetation without the team striking the same.

It is a futher object of the invention to provide supporting frames preferably mounted upon wheels, for controlling the depth to which the cultivating implements of the device will penetrate the soil.

It is a still further object of the invention to provide a cultivator having a wide sweep, with supporting frames and hand operated controlling means whereby one portion of the cultivator may be caused to penetrate the ground to a less depth than another portion of the cultivator, or all of the cultivating implements may be lifted entirely out of ground engaging position, all under the control of the operator or attendant.

With these and other objects in view the invention comprises certain novel constructions, combinations and arrangements of parts as will be hereinafter fully described and claimed.

In the accompanying drawing forming a part of this specification:

Figure 1 is a front elevation of the improved cultivator forming the subject matter of the present invention.

Fig. 2 is a top plan view of the same.

Fig. 3 is a side elevation of the said cultivator showing the same upon an enlarged scale.

Fig. 4 is an enlarged detail sectional view taken upon the line 4—4 of Fig. 2.

Fig. 5 is an enlarged detail sectional view taken upon the line 5—5 of Fig. 2.

The cultivator of this invention is similar to and an improvement upon the cultivator shown and described in my co-pending application for a patent upon a cultivator filed by me June 2, 1913, and bearing Serial No. 771,217. As in the previous device the cultivator is designed to be effective over a wide ground surface and is made to reach beyond the draft team to such a degree, upon opposite sides thereof as to reach beneath trees and other vegetation without striking or injuring the foliage, blossoms or fruit thereof. In the present improved form of the cultivator also, sectional controlling means is provided whereby a portion, or all of the cultivating implements mounted upon the device may be caused to penetrate desired depths in the soil according to the conditions thereof, or may be lifted entirely out of the soil when portions of the ground are not to be disturbed or when the implement is to be moved over roads or from place to place.

The details and features of the invention will now be more specifically described, reference being had to the accompanying drawing, in which 6 indicates a tongue or draft bar, to which is secured transverse beams 7 and 8. The beams 7 and 8 may be made of any desired material but are usually made of channel iron for lightness and strength and the said beams extend transversely of the tongue 6 near the rear end thereof, being secured thereto by any suitable fastening devices as 9. The said beams preferably extend to equal distances upon opposite sides of the tongue 6 and their outer ends are secured to and carried by side bars 10. The front beam 7 is braced with respect to the tongue 6 by means of diagonal brace bars 12.

The front and rear beams 7 and 8 are connected at suitable intervals by cross bars 13 which are bolted or otherwise secured at their ends to said beams 7 and 8 as clearly shown in Fig. 2 of the drawing. In the illustration half a dozen of said cross bars are shown upon each side of the tongue 6 but it will be apparent that a greater or less number thereof may be employed within the scope of the invention and that they may be arranged closer together or spaced farther apart as desired. The cross bars 13 not only connect and brace the beams 7 and 8 but serve as supports and carrying means for the ground engaging implements employed. As shown in the drawing a cultivating implement is mounted upon each of said cross bars 13 and preferably consists of a standard 14 carrying a suitable cultivator point 15 of any desired type. The standards 14 are somewhat enlarged at their upper ends and are provided with perforations 17 to receive bolts 18 by which they may be secured to the cross bars 13. Pivot bolts 19 also secure the said standards to the bars 13 and permit of their adjustment by setting the bolts 16 in any of the apertures 17 as desired. Any required angle of a standard with respect to its bar 13 may be secured in this manner and the cutting relation of the implement point 15 with respect to the soil may be thus altered.

In order to properly support the cultivator and to be able to control at will, the depth to which the implements will cut the soil, the beam frame made up of the beams 7 and 8 and the side bars 10 are mounted upon wheels 20. Each of the wheels is journaled upon the lower end of the standard 22 by means of a bolt 21. The standards 22 extend upwardly from the wheels and across the ends of the bars 10 to which they are pivotally connected by bolts 23. The said standards also extend some distance above the bar 10 and their upper ends are pivoted to the ends of a connecting bar 24. By the movement of the said bar 24 a parallel adjustment of the standards 22 is secured, as indicated in dotted lines in Fig. 3 and the position of the wheels is thus capable of alteration for varying the height of the cultivator points 15 with respect to the ground.

The adjustable supporting means for the cultivator are preferably independently adjustable under the control of the operator. For this purpose transverse shafts 25 and 26 are journaled in bearings 27 secured to cross bars 28. The said cross bars 28 are preferably secured at their ends to the beams 7 and 8 above the outermost and the innermost cross bars 13 as clearly shown in Fig. 2 and extend a sufficient distance above the said beams to not interfere with the adjustment of the implement standards below them, as will be clearly understood by reference to Fig. 3 of the drawing. The outer ends of the shafts 25 and 26 are formed with crank portions 29, the material of the shafts being usually turned at right angles thereto and somewhat flattened for this purpose. The ends of these portions are connected by means of links 30 with the connecting bars 24 of the standards 22.

The inner ends of the shafts 25 and 26 are also turned upwardly at 31 and are bolted or otherwise firmly fastened to levers 32 as clearly shown in Fig. 4. The said levers are provided with handles 33 at their upper ends and carry spring actuated latches 34 which are arranged to engage the teeth 35 upon segmental rack bars 36 mounted adjacent to the levers 32. The said rack bars are secured to the tongue 6 near the opposite edges thereof and suitable space is left between the levers 32 to permit of their operation independently of each other. The supporting standards may thus be moved into various positions by the operation of their levers 32, to vary the height of the implement carrying beam frame while the cultivator is in operation.

The front end of the tongue 6 is generally provided with any suitable clevis 37 to which the draft team or means may be secured. It is found in practice that a span of horses connected by a double-tree to the said clevis 37 is capable of operating a cultivator of wide reach with great facility and the ends of the cultivator will reach well beyond the span so as to extend well beneath the branches and foliage of trees or other vegetation, so as to cultivate to points near their stems or trunks without their being struck or injured by the team.

The independent adjustment of the end supporting frames by individual levers is admirably adapted to a cultivator of such a broad reach and the implements carried thereby may be raised or lowered and adjusted to fit the different conditions of the soil or ground surface over which the device is passing, and without stopping the same. When the standards 22 are brought to their full height or vertical positions, the cultivator will be so elevated that the implements will not engage the ground. This is needful when moving the mechanism from place to place and when traveling over roadways. Frequently also when cultivating around the trees of an orchard that borders a road, one end of the cultivator will pass outwardly over such a road and the cultivator implements at that end of the device may be lifted out of ground engaging position, so as not to injure the road surface, while the other end of the cultivator may be left in ground engaging position so as to cultivate the soil between the trees and the road. The device is thus entirely under the control of the operator or attendant and can be quickly adjusted by him to accommodate it to the varying conditions of the soil and locality.

What is claimed is:

1. A cultivator having an elongated transverse carrying beam frame adapted to reach under the foliage of trees for cultivating close to them, a plurality of pivoted standards at each end of the beam frame having a parallel pivoted movement and having ground engaging means and mounted on each end of the said beam frame, and means for adjusting said standards, whereby either end of the beam may be lifted out of cultivating position as when partially extending across a road, while the other end is in position to cultivate the ground.

2. A cultivator having an elongated transverse implement carrying beam frame, a plurality of standards at each end of the said frame having a parallel pivotal adjustment and mounted upon the ends of said beam frame for supporting the same and means arranged centrally of the beam frame for adjusting each set of standards at either end of the beam frame, whereby one may be made to cultivate the ground, while the other is lifted out of engagement with portions of the ground which it is not desired to cultivate, the central arrangement of the adjusting means permitting the ends of the beam frame to reach beneath foliage for cultivating around trees, bushes or the like.

3. A cultivator comprising a transverse implement carrying beam, bars secured to the ends thereof and projecting each way to the front and rear of the said beam, and a plurality of wheel carrying standards pivoted near the ends of the said beams and having parallel pivotal movements and arranged for supporting the cultivator, and means for adjusting the standards on their pivots and regulating the distance of the beam from the ground.

4. A cultivator having an implement carrying beam, transverse supporting side bars fastened to the ends of the beam, and arranged to project forwardly and rearwardly thereof, standards pivoted to the ends of said bars, bars connecting the said standard whereby the said standards of each bar are capable of a parallel movement in adjustment, means for holding said standards in adjusted positions for controlling the height of the cultivator, and supporting wheels carried by said parallel standards.

5. A cultivator made up of an implement carrying beam, bars fastened to the ends of said beam having their ends projecting well to the front and rear thereof, whereby tipping of the beam under cultivating strains will be prevented, wheel carrying standards pivoted near the ends of each of said bars, means for connecting the standards of each bar for securing a parallel action of the standards thereof, means for moving the said connecting means for adjusting the standards to vary the height of the beam from the ground.

6. A cultivator having an elongated transverse beam, low down supporting means secured to the outer ends of said beam comprising said bars secured to and extending across the ends of the cultivator beam and having adjustably mounted supporting wheels at the ends of the side bars and arranged in front and to the rear of the cultivating beam, independently operable means for adjusting said wheels arranged centrally of the cultivator beam, whereby the portions of the cultivator extending under the trees may be adjusted from the central portion of the beam, and draft means arranged opposite the central portion of the beam, whereby the cultivator may be pulled from a point outside the foliage of trees, while the end of the cultivator extends under the same.

7. A cultivator comprising a transverse beam structure having longitudinal bars at its ends, a plurality of supporting standards pivoted to each of said bars and having a parallel pivotal adjustment, a rock shaft connected with the supporting standards for moving them upon their pivotal points to vary the height of the cultivator, and lever mechanisms for controlling said rock shaft.

8. A cultivator having a transverse implement carrying beam provided with end supporting bars, wheel carrying standards supporting bars, wheel carrying standards journaled upon said bars, connecting bars joining the standards at each end of the cultivator, transverse rock shafts journaled upon the beam and having crank arms thereon, links connecting the crank arms with the said connecting bars, levers secured to each of said rock shafts and racks for holding the levers in their adjusted positions, the structure being such that one or both rock shafts may be adjusted as desired for adapting the cultivator to the varying conditions of the ground over which it is moved.

In testimony whereof, I have hereunto set my hand, in presence of two witnesses.

CLAUDE STONE.

Witnesses:
 CASSELL SEVERANCE,
 EARLE R. POLLARD.

Copies of this patent may be obtained for five cents each, by addressing the "Commissioner of Patents, Washington, D. C."